D. W. AUTRY.
WAGON BRAKE.
APPLICATION FILED DEC. 13, 1917.
1,278,564.
Patented Sept. 10, 1918.
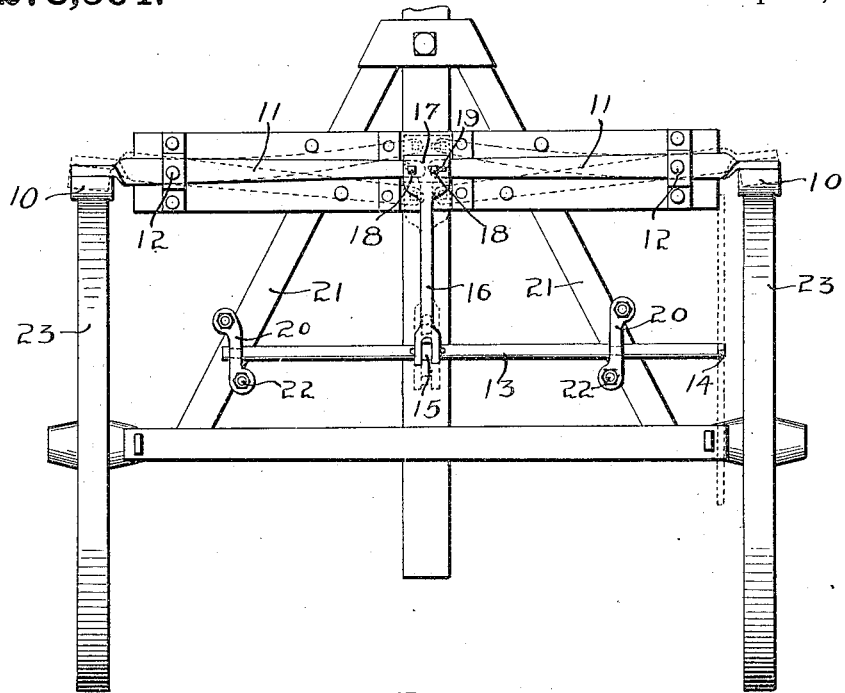
FIG. 1.
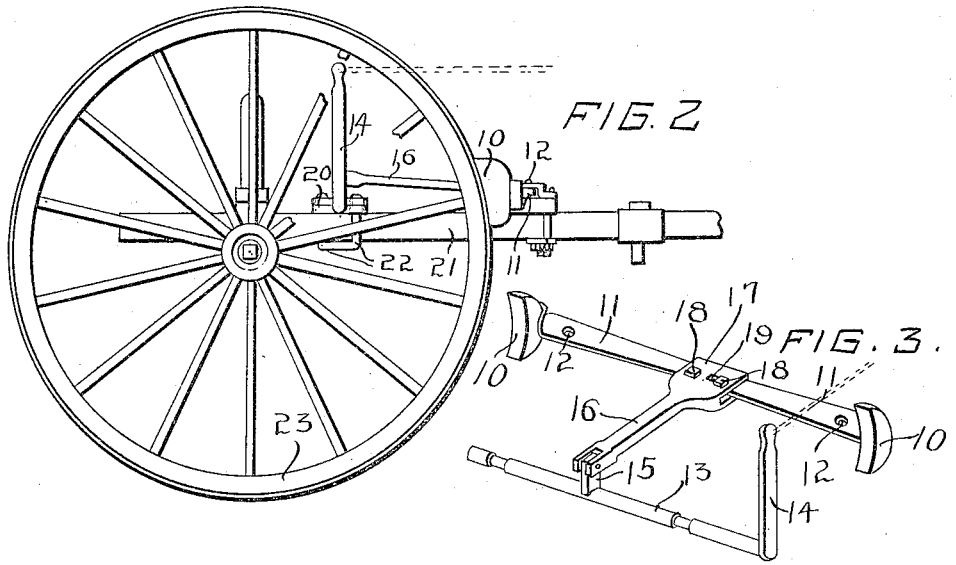
Witness
R. A. Thomas
Inventor
D. W. Autry

UNITED STATES PATENT OFFICE.

DANIEL W. AUTRY, OF GAINESVILLE, GEORGIA.

WAGON-BRAKE.

1,278,564.

Specification of Letters Patent. Patented Sept. 10, 1918.

Application filed December 13, 1917. Serial No. 206,992.

*To all whom it may concern:*

Be it known that I, DANIEL W. AUTRY, a citizen of the United States of America, residing at Gainesville, in the county of Hall, State of Georgia, have invented certain Improvements in Wagon-Brakes, of which the following is a description, reference being had to the accompanying drawings, forming a part thereof.

The object of the invention is to provide a simple, inexpensive and efficient brake apparatus adapted to be applied to a wagon having the ordinary and well known features of construction without modification thereof, said apparatus being constructed to provide for producing the maximum brake effect with the minimum effort on the part of the operator.

Further objects and advantages of the invention will appear in the following description of a preferred embodiment, it being understood that changes in the form, proportion and minor details may be resorted to within the scope of the appended claim without departing from the spirit of the invention.

In the drawing,

Figure 1 is a plan view of a brake apparatus constructed in accordance with the invention applied in the operative position to a wagon running gear.

Fig. 2 is a side view of the same.

Fig. 3 is a perspective view of the brake apparatus detached.

In the illustrated embodiment of the invention, the brake shoes 10 are carried by levers 11 having pivotal points 12, the operating or power arms of the levers being of a length greatly in excess of the operated or load arms thereof so as to give a maximum leverage in applying the brakes, while, of course, a comparatively limited movement of the brake shoes is secured.

The operation of the levers is accomplished by rock shaft 13 having an operating lever or handle 14 and provided with a crank arm 15 which is connected by link 16 with the long or power arms of the brake levers, said link, as illustrated, being provided with a bifurcated head 17 pivotally connected by bolts 18 with the brake levers and one of said bolts operating in slots 19 in the head to compensate for the angular movement of the brake levers.

The rock shaft is mounted in bearings formed in clamp plates 20 which are adapted to span the hounds 21 of a vehicle running gear, U-bolts 22 or the equivalents thereof being employed to extend under the hounds and secure the clamp plates in position. Obviously, these bearing elements may be mounted in any desired positions on the hounds and from time to time may be adjusted relatively thereto, if found necessary, in order to secure the desired position of the brake shoes with reference to the peripheries of the wheels 23 to compensate for wear, etc.

As illustrated, the operating lever is disposed adjacent to the rear wheels of the vehicle, but it is obvious that simple connections may be made between the same and a hand lever located at the front end of the vehicle or near the driver's seat, if it is desired to operate the same from that point.

The relation between the parts as described provides for maintaining the brake in a "set" position, exerting pressure upon the peripheries of the wheels, by swinging the operating lever to a horizontal or substantially horizontal position, where its movement may be limited by any suitable means, as when the operating lever is in such position the relation between the crank arm 15 and the link 16 is such as to produce an eccentric lock. When the operating lever is moved in the opposite direction to release the brakes, and has passed beyond the vertical position, its weight will serve to maintain the parts in their inoperative positions.

The advantages of the device described are the simplicity thereof and the fact that it may be applied to any vehicle of the ordinary well known construction wherein hounds are used to serve as an anchorage for the operating shaft, and the strength of such elements is not impaired by the application of the apparatus thereto, because there is no necessity to cut, bore or otherwise mutilate the hounds in order to apply the device.

Moreover by reason of the relative lengths of the operating lever 14 and the crank arm 15, and the relative lengths of the power and load arms of the brake shoe levers 11, the power expended in applying the brakes is vastly multiplied, and it is possible to secure the desired pressure upon the peripheries of the wheels with a very slight exertion on the part of the operator.

What I claim is:—

A brake apparatus having brake shoe carrying levers disposed with the extremities of their power arms adjacent to each other and in a common plane, a rock shaft provided with an operating arm and a crank arm, a link connecting said crank arm with the power arms of the brake levers and having a slotted connection with one of them, and bearing devices for the rock shaft consisting of clamp plates for contact with vehicle hounds, and U-bolts for adjustably securing said plates in place.

This specification signed and witnessed this 1st day of May A. D., 1917.

DANIEL W. AUTRY.

Witnesses:
A. S. RICHARDSON,
J. H. RICHARDSON.

Copies of this patent may be obtained for five cents each, by addressing the "Commissioner of Patents, Washington, D. C."